May 8, 1962 W. F. CLEMENT ETAL 3,033,042
TEMPERATURE-CORRECTED VELOCITY SENSOR
Filed May 9, 1960 2 Sheets-Sheet 1

INVENTORS
WARREN F. CLEMENT
RICHARD E. SCHAFFER
JOSEPH E. ZUPANICK
BY
ATTORNEY

May 8, 1962

W. F. CLEMENT ETAL 3,033,042

TEMPERATURE-CORRECTED VELOCITY SENSOR

Filed May 9, 1960

INVENTORS
WARREN F. CLEMENT
RICHARD E. SCHAFFER
JOSEPH E. ZUPANICK
BY

ATTORNEY

3,033,042
TEMPERATURE-CORRECTED VELOCITY SENSOR
Warren F. Clement, Glen Head, Richard E. Schaffer, East Meadow, and Joseph E. Zupanick, Westbury, N.Y., assignors to Sperry Rand Corporation, Great Neck, N.Y., a corporation of Delaware
Filed May 9, 1960, Ser. No. 27,745
3 Claims. (Cl. 73—509)

This invention relates to a device for providing a measure representative of the temperature-corrected velocity of a moving member that is particularly applicable to provide a measure of the temperature-corrected angular velocity of an aircraft engine.

Aircraft engines having rotating blades, for example, a turboprop engine having an axial flow compressor driven by a turbine, are subjected to widely varying intake gas temperatures and pressures due to wide variations in altitude, outside air temperature, and aircraft air speed. These variables affect the performance of the aircraft engine, and thus it is desirable to obtain a measure which is representative of engine performance under these varying flight conditions. Through dimensional analysis techniques, certain "corrected" parameters have been derived which accurately account for the effects of these variables and provide a generalized means of expressing engine performance. These "corrected" parameters have gained common acceptance in the aircraft industry. The direct measurement of these "corrected" parameters is therefore useful for the measurement and control of engine performance. For example, it is necessary in the control of a gas turbine engine to avoid compressor surge, a condition wherein unstable aerodynamic conditions in the compressor can lead to engine destruction. One of the "corrected" parameters which can be used to define the region of engine operation wherein surge can occur is corrected angular velocity, defined as the angular velocity of the compressor divided by the square root of the ratio of the actual compressor inlet total temperature to standard sea level temperature (519° R.). This corrected parameter is given the symbol $N/\sqrt{\theta}$, where $N$ is the actual angular velocity and $\theta$ is the temperature ratio.

It is a primary object of the present invention to provide a device for providing a measure of the temperature-corrected velocity of means producing pressure pulsations as a function of its movement.

Another object of the present invention is to provide a device for providing a measure of the temperature-corrected angular velocity of a rotating engine that may be subjected to wide variations in flight conditions and radiation effects.

The above objects are achieved by a device comprising resonant cavity means mounted proximate to the rotating blades of a gas engine and responsive to variations in the pressure of the gas stream through said engine caused by said rotating blades for providing a measure of its resonant condition, means responsive to said resonant condition measure for providing a signal having an amplitude representative of the resonant condition of said resonant cavity means, and means responsive to said signal for providing a measure of the temperature-corrected angular velocity of said engine.

Referring now to the drawings.

and a second condition of $$\left(\frac{N}{\sqrt{\theta}}\right)_2$$

Figure 1:
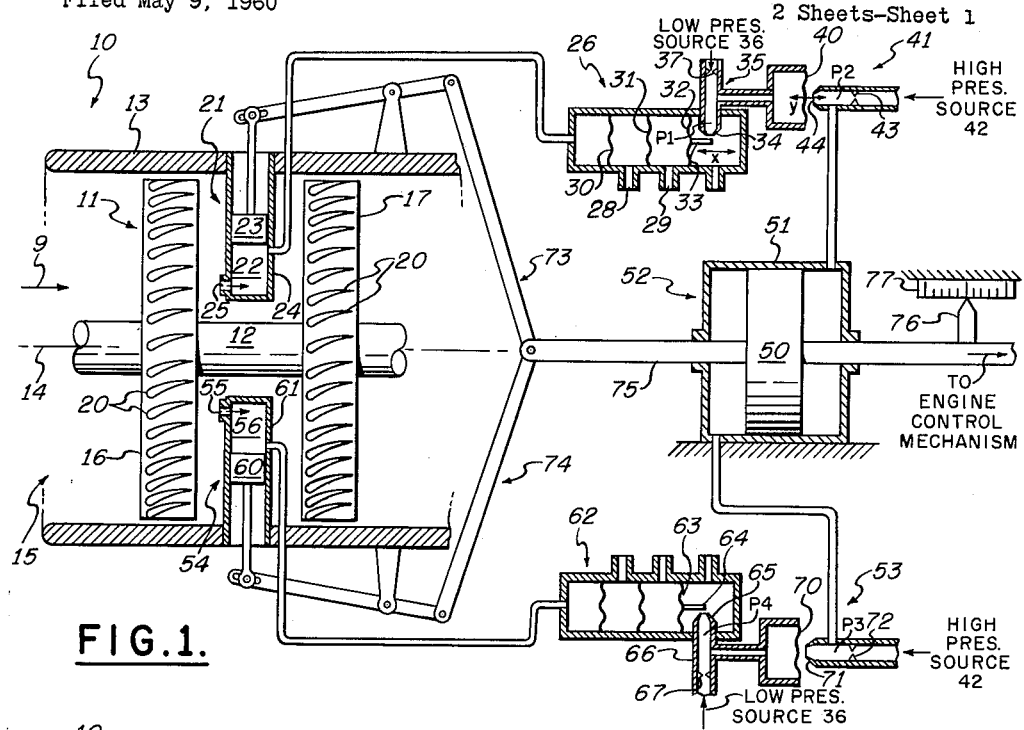
FIG. 1 is a schematic view of a preferred embodiment of a temperature-corrected angular velocity sensor applied to an axial flow gas engine with respect to a first condition $$\left(\frac{N}{\sqrt{\theta}}\right)_1$$
Figure 5:
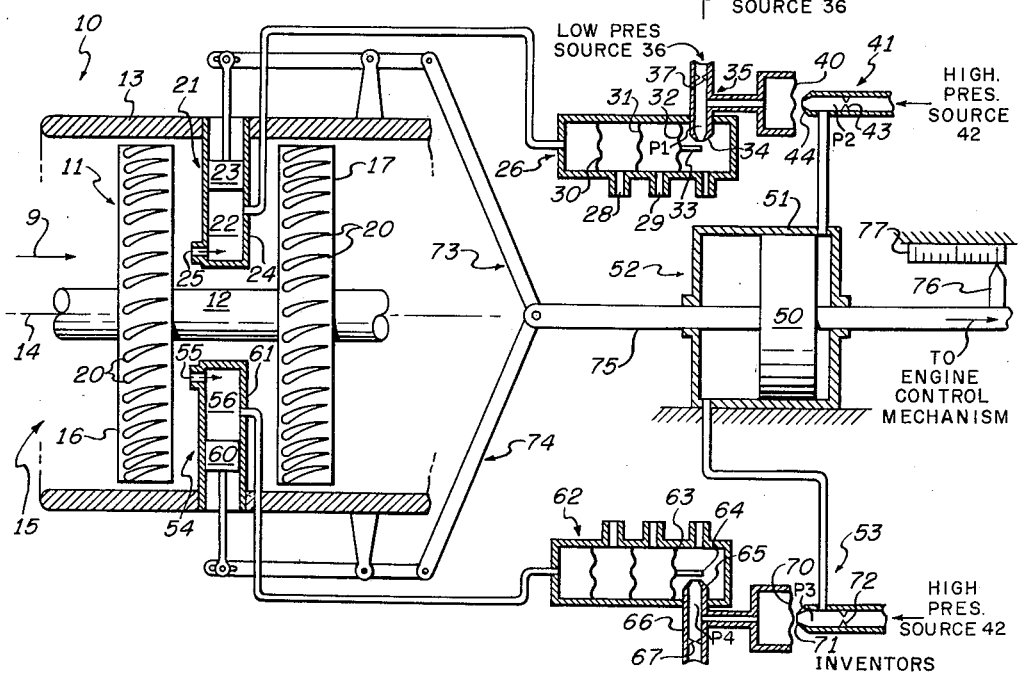

FIG. 5 is a schematic view of the embodiment of FIG. 1 with respect to a second condition $$\left(\frac{N}{\sqrt{\theta}}\right)_2$$

and

Figure 6:
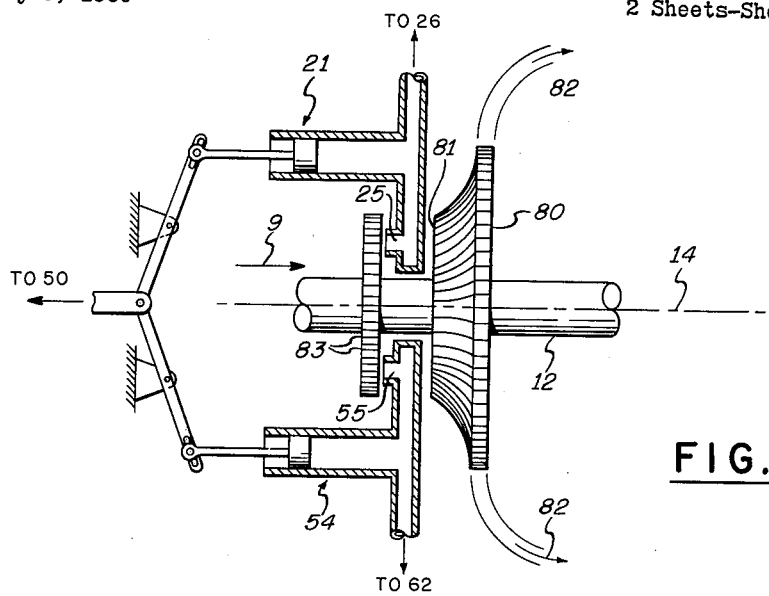

FIG. 6 is a schematic view of the invention applied to a centrifugal flow engine.

Referring to FIG. 1, the invention will be described for purposes of example with respect to a conventional turboprop aircraft engine 10 having an axial flow compressor 11 and a propeller (not shown) driven by means of an engine shaft 12 by a gas turbine (not shown). The gas engine 10 has a housing 13 that encloses the engine parts, the interior of which forms the duct through which the gas stream flows. The airstream is directed to flow axially through the engine 10 parallel to the engine longitudinal axis 14 in the direction indicated by the arrow 9 at the inlet 15 of the engine 10.

The compressor 11 has a plurality of stages of which only the first rotor stage 16 and the second rotor stage 17 are shown for purposes of simplicity. Each of the rotor stages comprises a plurality of rotor blades 20 radially disposed with respect to the shaft 12 and mounted thereon for rotation with the shaft 12. Although they are not shown for purposes of simplicity, it will be appreciated that the compressor 11 includes stator blades mounted on the housing 13 intermediate each of the rotor stages for deflecting the airstream to the succeeding rotor stage in a conventional manner.

In accordance with the teaching of the present invention, an adjustable cavity resonant device 21 is disposed intermediate the first rotor stage 16 and the second rotor stage 17 of the compressor 11. The device 21 consists of an adjustable cavity 22 formed by a movable piston 23 within a cylinder 24. The cylinder 24 has an opening 25 therein facing into the incoming airstream which communicates with the cavity 22. The opening 25 is mounted proximate the rotating blades 20 of the first stage 16 in order that a blade 20 passing the opening 25 will cause a perturbation of the pressure in the cavity 22 by interrupting the airstream.

There will then be some compressor angular velocity which will cause resonance within the cavity 22. The angular velocity at which this resonant condition occurs will be determined by the length of the cavity 22 and the velocity of sound in the cavity. The velocity of sound in the cavity 22 is proportional to the square root of the absolute temperature. This is the source of the aforementioned $\sqrt{\theta}$ correcting function for engine angular velocity, the air in the cavity being at a temperature very close to the stagnation temperature at the compressor inlet 15.

The cavity 22 will then resonate at a corrected engine angular velocity determined by the length of the cavity and the temperature. The corrected angular velocity at which the cavity 22 resonates can be adjusted by changing the length of cavity 22 by means of a movable piston 23. This principle is used in the present invention to provide a corrected engine angular velocity sensor by driving the piston 23 to maintain a near-resonant condition in the cavity in which case the position of the member driving the piston 23 is a measure of the corrected engine angular velocity. The device 21, for example may be incorporated within a compressor stator blade disposed intermediate the rotor stages 16 and 17.

The cavity 22 is connected to a pneumatic band pass filter 26. The filter 26 comprises series-connected capacitive chambers separated by diaphragms 30, 31, 32 which serve to reject low frequencies and shunt passages 28, 29 which serve to reject high frequencies that are out of the range of interest. The band pass filter 26 may be of the type disclosed in the texts by Harry F. Olson entitled "Dynamical Analogies" and "Elements of Acoustical Engineering" published by D. Van Nostrand Company Inc. New York. The output diaphragm 32 of the filter 26 has a knife edge 33 attached to it. The knife edge 33 serves as the target for the low pressure gas stream from the nozzle 34 of a low pressure flapper valve 35. A low pressure gas source 36 is connected through a pressure reducing orifice 37 to the nozzle 34 to provide a low pressure $P_1$ within the flapper valve 35. The displacement of the knife edge 33 in response to the pressure fluctuations from the cavity 22 is in horizontal directions as viewed in the drawing as shown by the arrow $x$.

Figure 2:
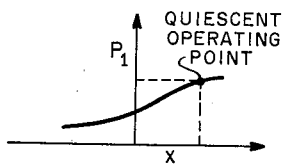
FIG. 2 is a graph showing the relationship of the variation in the pressure $P_1$ with respect to the displacement $x$ of the knife edge 33 of FIG. 1.

The quiescent operating point for the flapper valve 35 is arranged so that oscillations of the knife edge 33 back and forth across the nozzle 34 will produce only a decrease in the presure $P_1$ at a particular resonant condition of the cavity 22. This may be accomplished, as shown in FIG. 2, by arranging the quiescent operating point of the flapper valve 35 on the knee of the curve representing the pressure $P_1$ versus the knife edge displacement $x$. The effect of this will be to produce a halfwave rectification of the acoustic pressure wave from the cavity 22 thus causing the flapper valve 35 to function as a pneumatic half-wave rectifier.

Figure 3:
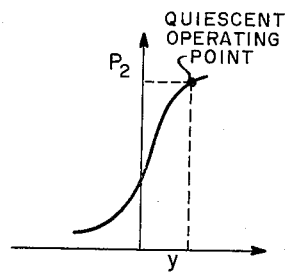
FIG. 3 is a graph showing the relationship of the variation in the pressure $P_2$ with respect to the displacement $y$ of the diaphragm 40 of FIG. 1.

To amplify the rectified signal from the flapper valve 35, a diaphragm 40 which serves as the target for a high pressure flapper valve 41 is connected to the flapper valve 35 to be responsive to the pressure $P_1$. A high pressure source 42 is connected through a pressure reducing orifice 43 to the nozzle 44 of the flapper valve 41 to provide a high pressure $P_2$ within the flapper valve 41. The quiescent operating point for the high pressure flapper valve 41 is arranged as shown in FIG. 3 so that oscillations of the diaphragm 40 produces only a decrease in the pressure $P_2$. Thus, the flapper valve 41 functions as a pneumatic rectifier as well as an amplifier.

As the pressure $P_1$ is lowered, the average displacement of diaphragm 40 will tend to withdraw it away from the nozzle 44 of the high pressure flapper valve 41 in a horizontal direction as indicated by the arrow $y$. The average value of the displacement of the diaphragm 40 will serve to lower the pressure $P_2$ in the flapper valve 41.

One side of a double acting piston 50 slideably disposed within a cylinder 51 is connected to be responsive to the pressure $P_2$ of the flapper valve 41. The piston 50 and cylinder 51 provide an actuating means in the form of a pneumatic motor 52. The cylinder 51 is fixed with respect to the housing 13.

In a manner similar to that described above the other side of the double acting piston 50 is responsive to a pressure $P_3$ from a second high pressure flapper valve 53. The pressure $P_3$ is obtained from a second series of elements identical to that described above. A second adjustable cavity resonant device 54 is disposed intermediate the first stage 16 and the second stage 17 of the compressor 11 with its opening 55 proximate the downstream side of the blades 20 of the first stage 16 and communicating with the cavity 56. However, the piston 60 is disposed within the cylinder 61 in order that the device 54 is tuned to a slightly different resonant frequency from the device 21. As shown with respect to the solid lines in FIG. 4, the cavity 22 is normally tuned to one resonant frequency while the cavity 56 is tuned to a slightly lower resonant frequency. For control purposes, for example, the two cavities 22 and 56 could be adjusted to slightly different lengths corresponding to corrected angular velocities slightly higher and slightly lower than the desired angular velocity.

The second series of elements are connected as described above with respect to the first series of elements with the cavity 56 connected to a band pass filter 62. The output diaphragm 63 of the filter 62 has a knife edge 64 attached to it which is cooperative with the nozzle 65 of a low pressure flapper valve 66. The low pressure source 36 is connected to the nozzle 65 through a pressure reducing orifice 67 to provide a low pressure $P_4$ within the flapper valve 66. A diaphragm 70 responsive to the low pressure $P_4$ is cooperative with the nozzle 71 of the high pressure flapper valve 53. The high pressure source 42 is connected to the nozzle 71 through a pressure reducing orifice 72 to provide the high pressure $P_3$ within the flapper valve 53.

One side of the double acting piston 50 is connected by means of a linkage 73 to the piston 23 of the device 21 and by means of a linkage 74 to the piston 60 of the device 54 for simultaneously positioning the pistons 23 and 60 respectively in directions tending to balance their near-resonant conditions in a manner to be more fully described in the operation of the invention. The other side of the double acting piston 50 is connected by means of a shaft 75 to an engine control mechanism (indicated by the legend) for controlling, for example, the angular velocity of the engine. The shaft 75 is also connected to a pointer 76 which cooperates with a graduated scale 77 to provide a measure of the temperature-corrected angular velocity of the engine 10. The scale 77 is fixed with respect to the housing 13.

Figure 4:
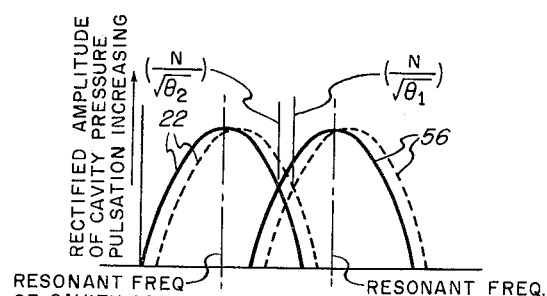
FIG. 4 is a graph showing the relationship of the rectified amplitude of the cavity pressure pulsation with respect to the pulsating pressure frequency from the first stage 16 of the compressor 11 of FIG. 1 with respect to a first condition of $$\left(\frac{N}{\sqrt{\theta}}\right)_1$$

The operation of the present invention will now be described referring to FIG. 1 where the engine 10 is operating at a first temperature corrected angular velocity $$\left(\frac{N}{\sqrt{\theta}}\right)_1$$

which we will assume is the point where, as shown in FIG. 4, the dotted lines of the graph intersect and the amplitude of the resonant frequencies of the cavities 22 and 56 are equal. In this condition the pistons 23 and 60 are in their relative positions, as shown, and the measures of the resonant conditions of the cavities 22 and 56 are transmitted to the filters 26 and 62, respectively, causing equal amplitude oscillations of the knife edges 33 and 64 thus resulting in the pressure $P_1$ being equal to the pressure $P_4$ and consequently with the pressure $P_2$ being equal to the pressure $P_3$. With the pressures $P_2$ and $P_3$ equal, the piston 50 remains fixed, for example, in the position as shown providing an indication of the temperature-corrected angular velocity on the scale 77 and a control signal to the engine control mechanism accordingly.

As the angular velocity of the engine 10 is decreased or as the inlet gas temperature is increased, the cavity 22 will increase its amplitude of resonance toward its peak value whereas the cavity 56 will decrease its amplitude of resonance away from its peak value. The increasing intensity of the acoustical vibrations from the cavity 22 are filtered through the band pass filter 26 causing an increasing amplitude of the displacement of the knife edge 33 thereby reducing the pressure $P_1$. With pressure $P_1$ reduced, the average displacement of diaphragm 40 will pull it away from the nozzle 44 thereby reducing the pressure $P_2$ in the flapper valve 41. The reduced pressure $P_2$ acting on the right side of the double acting piston 50 tends to position the piston 50 to the right as shown in FIG. 5 of the drawings.

Simultaneously, the decreasing intensity of the acoustical vibrations from the cavity 56 causes a decrease in the amplitude of the oscillations of the knife edge 64 resulting in the pressure $P_4$ more nearly approaching its maximum value causing the diaphragm 70 to maintain the pressure $P_3$ at a relatively high pressure almost equal to that of the high pressure source 42. The pressure $P_3$ acting on the left side of the double acting piston 50 tends to move the piston 50 to the right as shown in FIG. 5. As the piston 50 moves to the right, it will by means of the linkages 73 and 74, simultaneously and equally increase the volumes of the cavities 22 and 56 respectively, thereby decreasing the resonant frequency of each of the cavities 22 and 56, as shown in the solid line position of the graphs of FIG. 4. The system stabilizes when the amplitudes of the resonant frequency are again equal.

This condition is shown in FIG. 5 where the pressures $P_2$ and $P_3$ on each side of the double acting piston 50 are again equalized. In this condition with the piston 50 to the right, as viewed in FIG. 5, the pointer 76 now provides an indication on the scale 77 of the new temperature-corrected angular velocity $$\left(\frac{N}{\sqrt{\theta}}\right)_2$$

The position of the shaft 75 may also be utilized to provide a signal to the engine control mechanism to restore the angular velocity of the engine 10 to its original condition if desired.

The cavity size range required to cover the normal speed range of an 8000 r.p.m. engine having 60 to 70 blades in the first stage of the compressor 11 is approximately ⅜ to 3¾ inches. This size range permits incorporating the cavities within the compressor stator blades.

The present invention may also be applied to engines having centrifugal compressors as shown in FIG. 6 where the compressor 80 has its air inlet 81 peripherally disposed around the shaft 12 and discharges the compressed air radially in the directions indicated by the arrows 82. In this case, the stationary openings 25 and 55 of the resonant devices 21 and 54 respectively are disposed proximate a plurality of pressure pulsation producing blades 83 that are radially mounted on the shaft 12 for rotation therewith. The openings 25 and 55 are preferably disposed intermediate the blades 83 and the air inlet 81 of the compressor 80.

Although the systems have been described for purposes of example with respect to pneumatic elements it will be appreciated that the invention may be practiced utilizing analogous electrical and mechanical elements in lieu of the pneumatic elements disclosed.

While the invention has been described in its preferred embodiments, it is to be understood that the words which have been used are words of description rather than of limitation and that changes within the purview of the appended claims may be made without departing from the true scope and spirit of the invention in its broader aspects since the present invention may be used to sense temperature-corrected pulsations or motion in any device which creates pressure waves or pulses.

What is claimed is:

1. A device for providing a measure of the temperature-corrected angular velocity of a gas engine having rotating blades comprising first and second adjustable resonant cavity means mounted proximate said rotating blades, said first and second cavity means being nominally tuned to slightly different resonant frequencies with respect to each other, said first and second cavity means being responsive to variations in the pressure of the gas stream through said engine resulting from the rotation of said rotating blades for providing measures of their respective resonant conditions, first and second signal transducing means responsive to said first and second resonant condition measures respectively for providing first and second signals having amplitudes representative of said first and second resonant condition measures respectively, and means including actuating means responsive to said first and second signals tending to adjust said first and second adjustable resonant cavity means in directions to equalize the amplitudes of said first and second signals whereby the position of said actuating means is a measure of the temperature-corrected angular velocity of said engine.

2. A device for providing a measure of the temperature-corrected angular velocity of a gas engine having rotating blades comprising first and second adjustable cavity resonant means mounted proximate said rotating blades, said first and second resonant means being nominally tuned to slightly different resonant frequencies with respect to each other, said first and second resonant means being responsive to pressure perturbations induced by said rotating blades for providing first and second measures of their respective resonant conditions, first and second signal transducing means responsive to said first and second resonant condition measures respectively for providing first and second pressure signals having amplitudes representative of said first and second resonant condition measures respectively, a pneumatic motor, one side of said motor being responsive to said first pressure signal and the other side of said motor being responsive to said second pressure signal, and means connecting said motor to each of said first and second adjustable cavity resonant means for simultaneously adjusting said first and second resonant means in directions tending to equalize their resonant conditions whereby the position of said motor is a measure of the temperature-corrected angular velocity of said engine.

3. A device for providing a measure of the temperature-corrected angular velocity of a gas engine having rotating blades comprising first and second pneumatic adjustable cavity resonant means mounted proximate said rotating blades, the volumes of said first and second resonant means being individually adjustable, said first and second resonant means being nominally tuned to slightly different resonant frequencies with respect to each other, said first and second resonant means being responsive to interruptions of the flow of the gas stream caused by said rotating blades for providing first and second measures respectively representative of their resonant conditions, first and second filtering means responsive to said first and second resonant measures for providing first and second filtered resonant signals respectively, first and second rectifying means responsive to said first and second filtered resonant signals respectively for providing first and second rectified resonant signals respectively, first and second amplifying means responsive to said first and second rectified resonant signals for providing first and second amplified resonant signals having amplitudes proportional to said first and second measures respectively, a pneumatic motor, one side of said motor being connected to be responsive to said first amplified signal and the other side of said motor being connected to be responsive to said second amplified signal, means connecting said motor and said first and second resonant means for simultaneously adjusting the volumes of said first and second resonant means in directions tending to equalize their resonant conditions in accordance with the movement of said motor, and means connected to said motor for providing a measure representative of the temperature-corrected angular velocity of said engine.

(References on following page)

References Cited in the file of this patent

UNITED STATES PATENTS

| | | |
|---|---|---|
| 2,719,035 | Morris et al. | Sept. 27, 1955 |
| 2,879,467 | Stern | Mar. 24, 1959 |

FOREIGN PATENTS

| | | |
|---|---|---|
| 202,092 | Austria | Feb. 10, 1959 |
| 580,149 | Great Britain | Aug. 8, 1946 |
| 328,482 | Switzerland | Apr. 30, 1958 |